United States Patent Office 2,927,121
Patented Mar. 1, 1960

2,927,121

PROCESS FOR THE MANUFACTURE OF PREDNISOLONE-ACETATE

Josef Reinertshofer, Bad Soden (Taunus), and Manfred Schorr and Rudolf Junk, both of Frankfurt am Main, Germany, assignors to Farbwerke Hoechst Aktiengesellschaft vormals Meister Lucius & Bruning, Frankfurt am Main, Germany No Drawing. Application August 19, 1958
Serial No. 755,889

Claims priority, application Germany August 21, 1957

13 Claims. (Cl. 260—397.45)

The $\Delta^{1,4}$-pregnadiene-11$\beta$,17$\alpha$,21-triol-3,20-dione-acetate-(21), hereinafter referred to as prednisolone-acetate, which belongs to the class of $\Delta^{1,4}$-3-ketosteroids is the active substance of a great number of pharmaceutical preparations. The object of this invention is a process for the manufacture of prednisolone-acetate.

It is known that $\Delta^{1,4}$-3-ketosteroids can be prepared by microbiological processes, starting from $\Delta^4$-3-ketosteroids or 3-ketosteroids (cf. U.S. Patents 2,756,179 and 2,776,927, Belgian Patents 544,631, 546,636 and 544,993).

All these microbiological processes require large quantities of liquids, the so-called liquid culutre media, and above all sterile working conditions; a chemical process would, therefore, be of great interest for the technique concerned.

Now it is well known that $\Delta^{1,4}$-3-ketosteroids can be obtained also by chemical methods of preparation. Thus, for example, the treatment of 2,4-dibromocholestanone with collidine yields the $\Delta^{1,4}$-cholesta-dienone-(3) (cf. Butenandt et al., B. 72, (1939), page 1617; Inhoffen et al., B. 73 (1940), page 451); 2-iodo-$\Delta^4$-ketosteroids can be converted by means of Raney-nickel into $\Delta^{1,4}$-ketosteroids (cf. British Patent 761,351).

Starting substances for the synthesis of prednisolone-acetate are above all the $\Delta^4$-pregnene-11$\beta$,17$\alpha$,21-triol-3,20-dione, its corresponding 11-keto derivatives and the corresponding 21-acetates. The above mentioned chemical processes require, therefore, at least two stages of operation. It is further known that by treating $\Delta^4$-pregnene-21-ol-3,20-dione-acetate (desoxy-corticosterone-acetate) with lead tetra-acetate in a single-stage process a small amount of $\Delta^{1,4}$-pregnadiene-21-ol-3,20-dione-acetate (6.5%) can be obtained.

Finally, $\Delta^4$-pregnene-11$\beta$,17$\alpha$,21-triol-3,20-dione-21-acetate (Kendall's compound F, hereinafter referred to as F-acetate) can be dehydrogenated by means of selenium dioxide to form with good yield prednisolone-acetate (cf. Belgian Patent 548,288). It is, however, also known that the prednisolone-acetate prepared according to this method contains selenium. The separation of the selenium-containing substance is very difficult and entails a considerable reduction in the yield of prednisolone-acetate (cf. Florey, Restivo, J. Org. Chem. 22 (1957), page 406).

Now we have found that prednisolone-acetate can be prepared from the F-acetate in a single-stage process by dehydrogenating, in a liquid phase, the F-acetate with derivatives of the trivalent thallium.

As liquid phase there are used preferably low molecular fatty acids with the exception of formic acid, e.g. acetic acid, propionic acid or butyric acid. There can, however, also be used tertiary alcohol or a mixture of tertiary butyl-alcohol with the aforementioned fatty acids, or even a mixture of said fatty acids with inert solvents such as benzene, toluene or xylene.

The temperature at which the process is carried out has an influence on the yield. At higher temperatures, for example at 95° C., there is obtained after 3 hours, for example, in glacial acetic acid a mixture containing 20% of prednisolone-acetate and 34% of F-acetate. At 40° C. there is obtained after 500 hours, for example, in glacial acetic acid a mixture containing 33% of prednisolone-acetate and 32% of F-acetate. Prolonged action of the thallium-III-compound shifts the ratio of yield in favour of the perdnisolone-acetate, but reduces the yield of prednisolone-acetate with reference to the quantity of starting material used. When adding tertiary butanol or aromatic hydrocarbons, the reaction can be carried out at higher temperatures, for example at 80–100° C., without rapid decomposition—as is the case when using pure fatty acids. The thallium derivative used in the process of this invention is recovered in the form of the thallium-I-chloride, in a practically quantitative yield, which can be again regenerated in known manner to form the desired thallium-III-compound.

The reaction of the present invention was unexpected for those skilled in the art. Up to now, no case of oxidation or dehydrogenation by means of thallium-III-compounds was known, chiefly because such complicated molecules as those of the $\Delta^4$-3-ketosteroids offer a great many possibilities of oxidation or dehydrogenation which, in general, are more likely to occur than a $\Delta^1$-dehydrogenation. Thus, for example, it is known from microbiological processes that there may occur not only a dehydrogenation of $\Delta^4$-3-ketosteroids in 1-position but, for example, also an oxidation at the carbon atoms 11 or 14 (cf. e.g. Belgian Patent 549,221); with chloranil there are formed $\Delta^{1,4,6}$- or $\Delta^{4,6}$-3-ketosteroids but not $\Delta^{1,4}$3-ketosteroids (Agnello, Laubach, Am. Soc. 79, (1957), page 1258); with copper-acetate and oxygen the 21-hydroxyl group is oxidized (German patent application 1,002,756 laid open to public inspection) and with chromic acid-tertiary butylester in pyridine the 11-hydroxyl group.

The reaction according to the present invention is preferably carried out in such a manner that the F-acetate and the thallium-III-compound in a liquid phase are stored for a suitable period of time at temperatures ranging from 20–110° C., preferably from 40–80° C., the liquid phase is then removed, the residue is treated witht a convenient solvent, for example, methylene chloride, and water, and sodium bisulfite and a soluble chloride, as e.g. common salt, are added in order to reduce unreacted portions of the thallium-III-compound or to precipitate the thallium-I-chloride, respectively. The methylene chloride solution is separated dried, e.g. with sodium sulfate, and the solvent removed.

The residue, which contains besides prednisolone-acetate also decomposition products and possibly also F-acetate is worked up in known manner. It can, e.g. be triturated with a small amount of acetic ester, whereupon the prednisolone-acetate and the possibly present F-acetate are left behind in an undissolved state. The separation of the prednisolone-acetate from the F-acetate can be carried out in known manner, e.g. by countercurrent dispersion between, e.g. propylene glycol and toluene, or by paper-chromatography.

As thallium-III-compound there is preferably used thallium-oxyhydrate Tl00H or one of the thallium salts of low molecular fatty acids with the exception of formic acid. On the other hand, there can also be used thallium-III-chloride while taking up the hydrogen chloride that is formed during the reaction by addition of buffer substance, e.g. sodium acetate. The thallium compound is preferably applied in excess, an excess of at least 75% being advantageous.

By the process of the present invention it is made possible to obtain the prednisolone-acetate in a single-stage operation from F-acetate. In comparison with microbiological processes this process has the advantage that operation under sterile working conditions is unnecessary.

Moreover, the yields obtained by the process of the present invention are much greater than those obtained by the aforementioned process with lead tetra-acetate. In comparison to the process of dehydrogenation with selenium dioxide, the new process has furthermore the very important advantage that already the crude product is free from inorganic impurities.

The following examples serve to illustrate the invention but they are not intended to limit it thereto:

EXAMPLE 1

400 milligrams of F-acetate and 600 milligrams of thallium-III-acetate are dissolved in 90 milliliters of glacial acetic acid. The solution is stored for 6 days at 50° C., 600 milligrams of thallium-III-acetate are then added again and the whole is stored again for a further 6 days at 50° C. The glacial acetic acid is then decanted under reduced pressure at 50° C., the residue is shaken with 100 milliliters of methylene chloride and 10 milliliters of a saturated solution of common salt to which has been added such a quantity of sodium bisulfite as is left on the point of a spatula. Thereupon two layers form while the brown colour of the trivalent thallium disappears, and thallium-I-chloride separates at the separation plane of the two phases of liquids, which is collected by filtration. The methylene chloride phase is then separated off, dried with sodium sulfate and the solvent evaporated. There remain behind 390 milligrams of a substance having a paper-chromatographically determined content of 32% of prednisolone-acetate and 36% of F-acetate (determination according to Zaffaroni et al., J. biol. Chemistry, 188, (1951), page 763).

The crude product is then triturated with a small amount of acetic ester and filtered with suction in the cold. The remaining product has a content of 45% of prednisolone-acetate and 50% of F-acetate. By preparative descending chromatography with the aid of Schleicher & Schüll paper 2043 b Mgl and propylene glycol as stationary phase and toluene as mobile phase there are obtained on a paper having 50 cm. of length two sharply separated fractions the first of which contains the unreacted F-acetate and the second containing prednisolone-acetate. After evaporation of the solvent and trituration with a small amount of acetic ester in order to eliminate the propylene glycol there is obtained pure prednisolone-acetate.

A sample of this substance yields, after being recrystallized from methanol, a product having a spectrum which shows all the infrared absorption peaks typical for this substance (at 6.02; 6.20; 6.26; 7.62; 8.55; 10.66; 12.16$\mu$) and in which all the peaks which are typical for the F-acetate are missing (at 6.12; 6.88; 10.16; 11.36; 13.41$\mu$).

EXAMPLE 2

A mixture of 400 milligrams of F-acetate and 400 milligrams of thallium oxyhydrate is heated for 3 hours on the steambath with 90 milliliters of glacial acetic acid and worked up in the manner described in Example 1.

The crude product so obtained has a content of 20% of prednisolone-acetate and 34% of F-acetate.

The thallium-oxyhydrate used in this case was prepared by precipitation from a thallium-III-chloride solution by means of sodium hydroxide solution, washing with water and methanol and drying in a dessicator over phosphorus pentoxide.

EXAMPLES 3–15

The following table gives further examples of execution which can be carried out while using the values given therein.

Thus, each time a mixture of 400 milligrams of F-acetate and of A milligrams of the thallium-III-compound is heated in L for a period $t$ to a temperature of T° C. and worked up in the manner as described in Example 1. The so obtained crude product has a content of $x$% of prednisolone-acetate and $y$% of F-acetate.

| Example | A mg. | Thallium-III-compound | L | $t$ | T, ° C. | $x$ | $y$ |
|---|---|---|---|---|---|---|---|
| 3 | 450 | Acetate | 90 ml. of glacial acetic acid | 7 days | 50 | 14 | 54 |
| 4 | 600 | do | do | 5.5 days | 50 | 22 | 56 |
| 5 | 800 | do | do | 11 days | 50 | 20 | 40 |
| 6 | 250 | Oxyhydrate | do | 4 hours | 95 | 13 | 39 |
| 7 | 400 | do | do | 24 hours | 60 | 18 | 64 |
| 8 | 600 | do | do | 110 hours | 50 | 31 | 48 |
| 9 | 1,200 | do | do | 184 hours | 50 | 32 | 20 |
| 10 | 700 | do | do | 21 days | 40 | 21 | 34 |
| 11 | 1,200 | do | do | 21 days | 40 | 33 | 32 |
| 12 | 800 | Acetate | 20 ml. of glacial acetic acid and 100 ml. of tert. butanol | 24 hours | 70 | 17 | 46 |
| 13 | 800 | do | 50 ml. of glacial acetic acid and 50 ml. of toluene | 12 hours | 80 | 4 | 40 |
| 14 | 400 | Oxyhydrate | 80 ml. of propionic acid | 24 hours | 70 | 10 | 50 |
| 15 | 400 | do | 80 ml. of butyric acid | 24 hours | 70 | 4 | 30 |

We claim:

1. A process for preparing prednisolone-acetate which comprises dehydrogenating $\Delta^4$-pregnene-11$\beta$,17$\alpha$,21-triol-3,20-dione acetate-(21) with a trivalent thallium compound of the group consisting of thallium oxyhydrate and thallium (III) salts of fatty acids containing from two to four carbon atoms in a liquid phase and at a temperature between about 20 and 110° C., said liquid phase being a member of the group consisting of acetic, propionic and butyric acids, mixtures of said acids with tertiary butyl alcohol, and mixtures of said acids with an inert solvent of the group consisting of benzene, toluene and xylene.

2. A process as defined in claim 1 wherein the temperature is between about 40 and 100° C.

3. A process as defined in claim 1 wherein the tallium compound is thallium oxyhydrate.

4. A process as defined in claim 1 wherein the thallium compound is thallic acetate.

5. A process as defined in claim 1 wherein the liquid phase is glacial acetic acid.

6. A process as defined in claim 1 wherein the liquid phase is propionic acid.

7. A process as defined in claim 1 wherein the liquid phase is butyric acid.

8. A process as defined in claim 1 wherein the liquid phase is a mixture of glacial acetic acid and tertiary butanol.

9. A process as defined in claim 1 wherein the liquid phase is a mixture of glacial acetic acid and toluene.

10. A process for preparing prednisolone-acetate which comprises dehydrogenating $\Delta^4$-pregnene-11$\beta$,17$\alpha$,21-triol-3,20-dione acetate-(21) (F-acetate) with a solution of thallic acetate in glacial acetic acid for about twelve days at a temperature of about 50° C., the ratio by weight of F-acetate to thallic acetate being about 1:3; distilling the glacial acetic acid off at about 50° C.; treating the residue with methylene chloride and an aqueous solution of sodium bisulfite; washing the product obtained from the methylene chloride solution with acetic acid ethyl ester; and separating the remaining mixture of prednisolone-acetate and F-acetate.

11. A process for preparing prednisolone-acetate which comprises dehydrogenating $\Delta^4$-pregnene-11$\beta$,17$\alpha$,21-triol-3,20-dione acetate-(21) (F-acetate) with a solution of thallic acetate in a 1:1 mixture of glacial acetic acid and toluene for about twelve hours at a temperature of about 80° C., the ratio by weight of F-acetate to thallic acetate being about 1:2, distilling off the liquid phase; treating the residue with methylene chloride and an aqueous solution of sodium bisulfite; washing the product obtained from the methylene chloride solution with acetic acid ethyl ester; and separating the remaining mixture of prednisolone-acetate and F-acetate.

12. A process for preparing prednisolone-acetate which comprises dehydrogenating $\Delta^4$-pregnene-11$\beta$,17$\alpha$,21-triol-3,20-dione acetate-(21) (F-acetate) with a solution of thallic acetate in a 1:5 mixture of glacial acetic acid and tertiary butanol for about 24 hours at a temperature of about 70° C., the ratio by weight of F-acetate to thallic acetate being about 1:2 distilling off the liquid phase; treating the residue with methylene chloride and an aqueous solution of sodium bisulfite; washing the product obtained from the methylene chloride solution with acetic acid ethyl ester; and separating the remaining mixture of prednisolone-acetate and F-acetate.

13. A process for preparing prednisolone-acetate which comprises dehydrogenating $\Delta^4$-pregnene-11$\beta$,17$\alpha$,21-triol-3,20-dione acetate-(21) (F-acetate) with a solution of thallic acetate in propionic acid for about 24 hours at a temperature of about 70° C., the ratio by weight of F-acetate to thallic acetate being about 1:1; distilling the propionic acid off at about 50° C.; treating the residue with methylene chloride and an aqueous solution of sodium bisulfite; washing the product obtained from the methylene chloride solution with acetic acid ethyl ester; and separating the remaining mixture of prednisolone-acetate and F-acetate.

No references cited.